United States Patent

[11] 3,627,126

[72] Inventors John R. Fitzgerald;
Lloyd E. Allen, both of Cameron County, Tex.
[21] Appl. No. 1,697
[22] Filed Jan. 9, 1970
[45] Patented Dec. 14, 1971
[73] Assignee Tri-Pak Machinery Service, Inc.

[54] APPARATUS FOR SIZING CANTALOUPES AND OTHER GENERALLY ROUND OBJECTS
7 Claims, 6 Drawing Figs.
[52] U.S. Cl................................................. 209/91, 209/103
[51] Int. Cl...................................................... B07c 5/06
[50] Field of Search........................................... 209/100, 103, 107, 108, 91

[56] References Cited
UNITED STATES PATENTS
931,993   8/1909   Cary............................. 209/91
1,643,190 9/1927   Von Canon ................... 209/103
FOREIGN PATENTS
137,110   3/1948   Australia...................... 209/103

Primary Examiner—Allen N. Knowles
Attorney—Pravel, Wilson & Matthews

ABSTRACT: Apparatus for separating cantaloupes or other generally round objects into groups according to size so that each separated group has objects within a predetermined size range, and wherein such sizing is accomplished with substantially no bruising, peeling or other damage to the cantaloupes or other objects.

Patented Dec. 14, 1971

John R. Fitzgerald
Lloyd E. Allen
INVENTORS

BY

Pravel Wilson & Matthews
ATTORNEYS

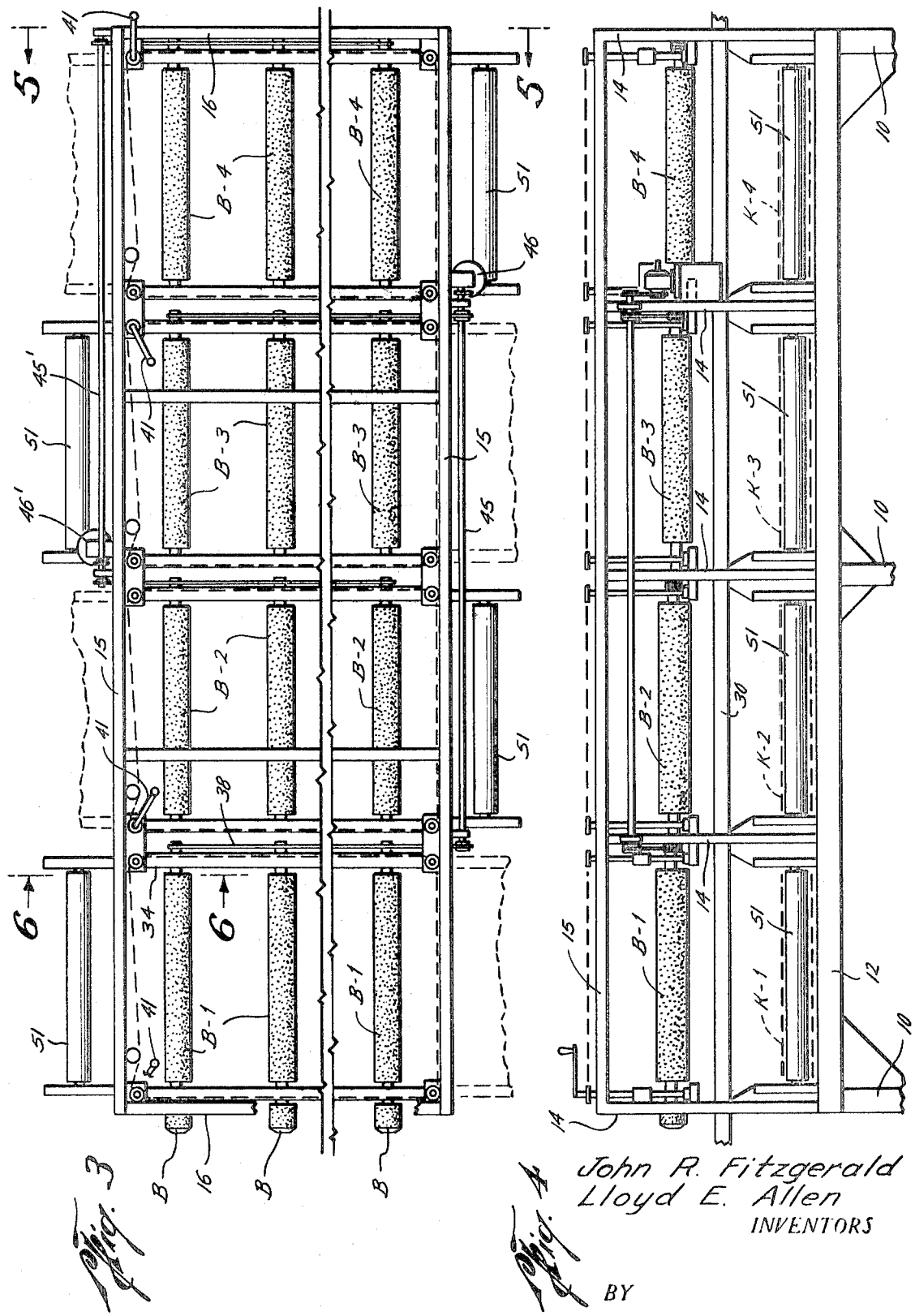

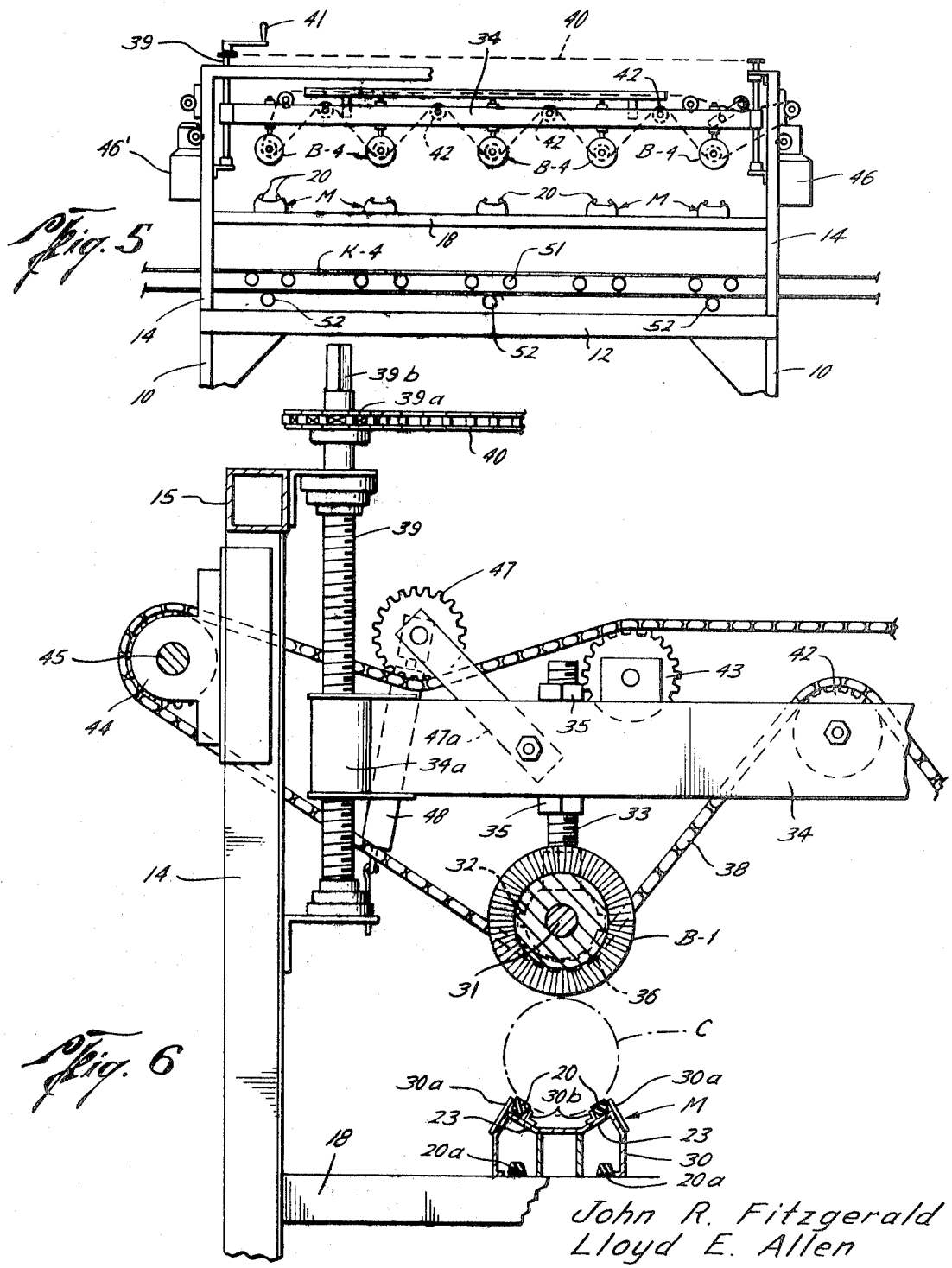

APPARATUS FOR SIZING CANTALOUPES AND OTHER GENERALLY ROUND OBJECTS

BACKGROUND OF THE INVENTION

The field of this invention is apparatus for sizing generally round objects.

In recent years, cantaloupes and similar objects have been packaged in cardboard boxes rather than the more rigid wooden crates or boxes used in the past. Although the use of the cardboard boxes has certain advantages, their use introduces the problem of precision packing, particularly with respect to cantaloupe and other objects which might become bruised or otherwise damaged in shipping and handling. To minimize bruising and other damage, the cantaloupes should fit fairly tightly in the box but they should not be overcrowded or positioned so that bulging of the cardboard box occurs.

Heretofore, the precision packaging has been essentially by experienced and skilled workmen who manually selected the sizes of cantaloupe to fit properly into a particular cardboard box. The speed and accuracy with which such manual selection and packaging was accomplished depended entirely upon the skill and judgment of the workmen. Various efforts have been made in the past to size fruit mechanically, as represented by U.S. Pat. Nos. 1,257,018; 1,272,307; 1,310,394; 1,457,143; and 2,630,222, but so far as is known, none of such mechanical sizers have been commercially satisfactory. In most instances, the prior sizers have contacted the fruit from the side rather than from above, and therefore the fruit was confined or lodged between a longitudinally moving conveyor and a laterally moving roller or conveyor or a fixed wall as the fruit moved longitudinally, which confinement during movement subjected the surface on the fruit to a partial or complete removal of some of the skin or outer surface. Such "skinning" is undesirable from an appearance standpoint in the marketing of the fruit, and if serious enough, it may even render the fruit unmarketable. Further, because of such prior art constructions, the fruit was discharged from the sizer on only one side thereof, so that all of the subsequent packaging had to be located on that side.

SUMMARY OF THE INVENTION

This invention relates to an apparatus for automatically sizing cantaloupe or other generally round objects, wherein the objects are supported on moving conveyors below rotating brushes and wherein partial or complete removal of the skin or outer surface of the objects is avoided or inhibited. The apparatus has brushes rotating in opposite directions to discharge objects of different sizes to opposite sides of the brushes to thereby facilitate the subsequent handling and packaging of the objects. Preferably, inclined belts forming a moving trough underneath the rotating brushes, are employed so as to fully support the objects without rubbing or abrasion, and so as to contact the brushes only at the time of imparting lateral movement of the objects from the belts to other conveyor means.

BRIEF DESCRIPTION OF THE DRAWING

FIG. 3 is a plan view of a portion of the apparatus of this invention, shown enlarged for more details;

FIG. 4 is an elevation of the apparatus of this invention, illustrating it more in detail as compared to FIG. 2;

FIG. 5 is an end view taken on line 5—5 of FIG. 3; and

FIG. 6 is an enlarged detail of a portion of the apparatus taken on line 6—6 on FIG. 3.

DESCRIPTION OF THE PREFERRED EMBODIMENT

Figure 1:
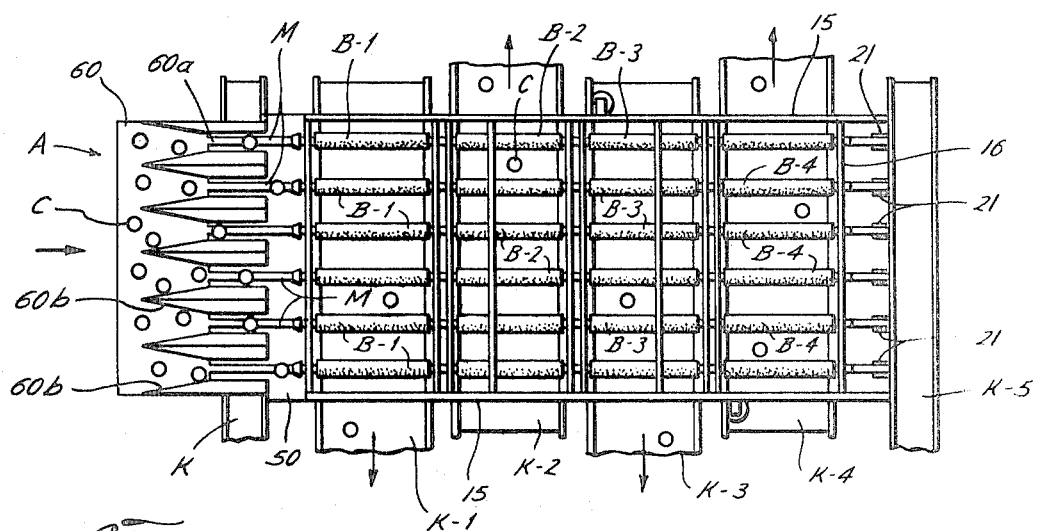
FIG. 1 is a plan view of the apparatus of this invention.

In the drawings, the letter A designates generally the apparatus of this invention which is adapted to separate or size cantaloupe or other generally round objects C, into different groups having predetermined size ranges. The apparatus A includes a frame F which has mounted thereon a plurality of moving conveyors M which extend longitudinally of the frame F and are adapted to move the cantaloupe or other objects C in longitudinal rows. As will be explained more in detail, a plurality of brushes B-1 through B-4 are disposed longitudinally above each of the moving conveyors M for imparting lateral movement to objects when engaged by such brushes so as to move the cantaloupe or other objects C laterally off of the moving conveyors M. Preferably, the cantaloupe or other objects C are received by laterally moving conveyors K-1 through K-4, as will be explained in detail hereinafter. An initial conveyor K and a final conveyor K-5 are also provided in the preferred form of the invention.

The frame F may be made of any suitable materials and any configuration so long as it is suitable for supporting the various working parts of the apparatus A of this invention. For example, the frame F may include a plurality of legs 10 which rest upon a floor or base 11. The legs 10 are connected at their upper ends to a platform 12 which is generally rectangular in shape, and which has welded or otherwise secured thereto vertical frame risers 14 which are joined with upper longitudinal frame members 15 and lateral frame members 16 (FIGS. 1-4). The moving conveyors M are preferably supported on cross braces 18 which are welded or otherwise secured between oppositely disposed vertical risers 14 (FIGS. 5 and 6).

Each of the moving conveyors M is preferably identical, and some of the details thereof can best be seen in FIG. 6. Each moving conveyor M includes a pair of endless flexible belts 20, each of which is preferably of the type known as a "V-belt" since it has tapered or inclined sidewalls for frictionally fitting into a suitable drive pulley 21 (FIGS. 1 and 2) of conventional construction. The drive pulleys 21 are rotated by any suitable power means (not shown). Each of the belts also passes over an idler pulley 22 (FIG. 2) at the forward end of the apparatus A. The upper reach of each of the endless conveyor belts 20 is supported by inclined plates 23 so that the pair of upper reaches of the endless belts 20 are disposed at opposite angles of inclination, which slope towards each other (FIG. 6). The inclined belt support plates 23 are part of a longitudinally extending guide assembly 30 formed of sheet metal or other suitable material. Such guide assembly 30 includes external guide portions 30a which extend externally of the upper reaches of the pair of belts 20. The lower or inner portions of each of the upper reaches of the belts 20 are confined by longitudinally extending guide strips 30b so as to maintain the belts 20 spaced from each other laterally for providing a spaced support for the cantaloupe or other objects C thereabove. The material of the belts 20 is preferably resilient, such as rubber or a fiber-rubber composition, so that the fruit or other objects C are supported solely by such resilient belts 20. The fruit or other objects C are prevented from frictionally contacting any other part of the apparatus A, except for a brief engagement with a particular part of one of the rollers or brushes B-1 through B-4, as will be explained. Therefore, the fruit or other object C is subjected to substantially no abrasion or rubbing which might partially or completely remove any portion of its outer surface or skin. This is particularly important in connection with cantaloupe since even the outer netting or lace of the outer skin should not be removed, and the present apparatus substantially eliminates any such removal.

The lower reaches of the belts 20 may pass inwardly of the longitudinal support 30 as indicated at 20a (FIG. 6).

As previously noted, a plurality of brushes B-1 through B-4 are disposed above each of the moving conveyors M, with their longitudinal axes disposed directly above, and preferably midway between, the upper reaches of the pair of belts 20 in each of the moving conveyors M (FIG. 6). The brushes are mounted in lateral sets with all of the brushes B-1 being disposed side by side above the moving conveyors M therebelow. Similarly, the brushes B-2 are disposed in a set above the moving conveyors M, and the brushes B-3 and B-4 are disposed in separate sets above the moving conveyors M. Preferably, each of the sets of brushes is separately adjustable vertically to obtain the desired distance between the lower portion of the brushes and the moving belts 20 of each of the moving conveyors M. The most forward set of brushes B-1 is at a higher elevation than the second set of brushes B-2. The set of brushes B-3 is slightly lower than the brushes B-2, and the last set of brushes B-4 is at the lowermost elevation with respect to the moving conveyors M.

Figure 2:
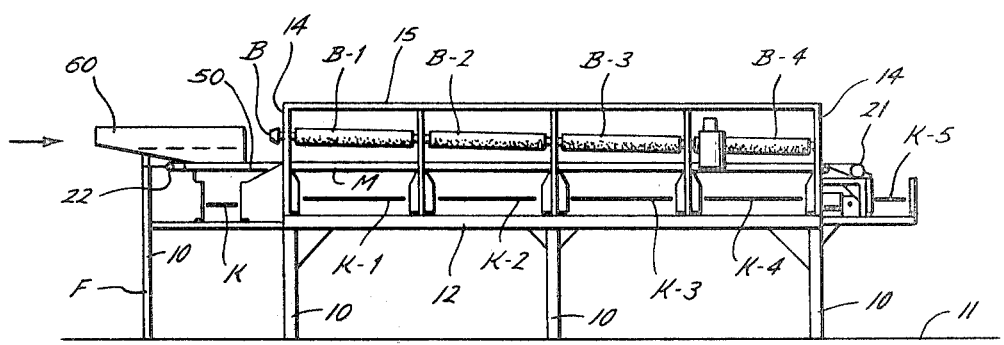
FIG. 2 is an elevation of the apparatus of this invention.

The rollers or brushes may be inclined so that their forward ends are higher than their rearward ends, and so that the rearward ends are substantially at the same distance above the moving conveyors M as the forward ends of the next brush. For example, as shown in FIG. 2, the rollers B-1 are inclined downwardly from left to right and the rearward portion is at approximately the same distance from the moving conveyor M as the forward end of the brushes B-2. The same relationship may exist with respect to the brushes B-2, B-3 and B-4.

Each set of brushes is preferably mounted for adjustability vertically with respect to the moving conveyors M. Thus, considering the set of brushes B-1 first, such brushes B-1 are each provided with a longitudinal shaft 31, the axis of which is disposed substantially midway between the belts 20 of the moving conveyor M therebelow. The shafts 31 extend through suitable bearing blocks 32 at each end of such shafts 31. The bearing blocks 32 may be supported on a threaded bolt or stud 33 which extends through and is secured to a horizontal brush support member 34 by retaining nuts 35. It will be appreciated that by loosening the nuts 35, the bearing 32 may be moved upwardly and downwardly so as to change the location of the shaft 31. Such adjustment of the shaft 31 with the threaded bolt or stud 33 is primarily for the purpose of maintaining tight engagement between a sprocket 36 on one end of the shaft 31 with a drive chain 38, the function of which will be explained more in detail hereinafter.

The brush-supporting member 34 is vertically movable because it is provided with a nut 34a at each end which is in threaded engagement with a rotatable adjusting rod 39 having inter engaging threads with the nut 34a. As will be more evident hereinafter, since there is a threaded adjusting rod 39 at each corner of the set of brushes B-1, they may be interconnected by a common chain 40 which engages with the sprocket 39a so that upon rotation of only one of the rods 39, all of the rods 39 will be rotated at the same time. A square head 39b is preferably provided for receiving a removable crank 41 (FIG. 3) to effect such adjustment.

An idler sprocket 42 is provided between each of the brushes B-1 (FIG. 6), and an upper idler sprocket 43 is also provided for supporting the upper portion of the drive chain 38. The drive chain 38 is connected to a sprocket 44 which is mounted on a shaft 45 which is driven by any suitable source of power such as a motor 46. In FIG. 6, the motor driven shaft 45 is shown on the left whereas in FIG. 3, such shaft 45 is shown on the right with respect to the set of brushes B-1. This is purely for ease of illustration, and the correct relationship between the shafts 45 can be seen clearly in FIG. 3. The chain 38 passes under the sprocket 36 for each of the roller B-1 and over the idler rollers 42 therebetween. To maintain the chain 38 taut at all times, a movable sprocket 47 is pivotally mounted on an arm 47a to the member 34 and is resiliently urged into contact with the chain 38 by a spring 48. The forward ends of the shafts 31 are supported in similar bearing 32, but the sprocket 36 is not needed since the driving is accomplished through the rearward portions of the shafts 31 as best seen in FIG. 3.

The entire set of the brushes B-1 may thus be adjusted vertically simultaneously by rotating one of the threaded rods 39 with a crank 41. If the chain 40 is detached or temporarily rendered inoperative, the ends of the members 34 may be separately adjustable, although this is not normally done in equipment after it has been installed. The adjustment provides for a different spacing between the lower surfaces of the brushes B-1 and the belts 20 of the moving conveyors M so as to accommodate different sizes of fruit or other objects C to be separated or sized.

Each of the other sets of brushes is mounted in the same manner as described in connection with the set of brushes B-1, so that each of such sets is separately adjustable as a set. It is to be noted that the set of brushes B-1 and set of brushes B-3 are operated from the same motor 46 and a common shaft 45 so that the direction of rotation of the brushes B-1 and B-3 is the same. The sets of brushes B-2 and B-4 are driven by a common motor 46' and a common shaft 45' so that they are rotated together in the same rotational direction, and preferably opposite to that of the sets of rollers or brushes B-1 and B-3. Thus, alternate sets of the brushes rotate in opposite directions, such directions being indicated by the arrows for the conveyors K-1 through K-4 in FIG. 1. Thus, viewing the apparatus A from the left-hand end of the apparatus as shown in FIG. 1, the rollers B-1 and B-3 rotate so as to discharge the fruit or other objects C to the right, and the conveyors K-1 and K-3 therebelow are also moving in that direction. The sets of rollers B-2 and B-4 are rotating so as to discharge the fruit or other objects C to the left which is the same direction as the conveyors K-2 and K-4 are moving. This provides for a movement of different groups of fruit in accordance with the separated sizes to locations on opposite sides of the apparatus A to facilitate subsequent sorting and packaging, rather than having all of the fruit or objects C on the same side of the apparatus A.

At the forward end of the brushes B-1, end brushes or rollers B are provided which are disposed higher than the brushes B-1 so that they engage the very largest of the fruit or other objects C and cause such fruit or other objects to drop off of the conveyors M and downwardly along an inclined guide plate 50 (FIGS. 1 and 2) onto the conveyor K. Such conveyor K may move in either direction. The fruit or other objects C which are not separated by the time it reaches the end of the apparatus A is discharged onto the conveyor K-5. Normally, such objects are the smallest ones which are in the group being fed to the apparatus A, and they can be moved on the conveyor K-5 in either direction, depending upon whether or not such objects are to be packaged or discarded. The conveyors K through K-5 are of conventional construction and include endless flexible belts such as shown in dotted lines in FIG. 5 for the belt K-4. Each conveyor K through K-5 has internal rollers 51 which support the upper reach of the conveyor or belt and lower rollers 52 which support the lower reach thereof (FIG. 5). However, it is to be understood that any type of suitable receiving station or conveyor may be utilized in connection with the apparatus A of this invention.

The fruit or other objects C are initially fed in an unorganized grouping and random sizes to an inlet unit 60 (FIGS. 1 and 2), which has a plurality of tracks or channels 60a disposed over the moving conveyors M. Each channel 60a has tapered guide walls 60b leading thereto so as to confine the incoming fruit or other objects C to a single row as they reach each channel 60a over the moving conveyors M. The fruit or other objects C may be forced to move to the channel 60a by gravity or by a belt conveyor (not shown) feeding them to such location. In any event, the inlet unit 60 organizes the unorganized fruit or other objects C into the rows above the moving conveyors M and places them in position thereon since the moving conveyors M extend directly below the channels 60a and thereafter such conveyors M move the fruit or other objects C thereon in the rows so that they ultimately contact one of the brushes B through B-4. The bristles on the brushes B-1 through B-4 are preferably made of a flexible plastic material such as polypropylene, or any other suitable material which is not stiff enough to brush off the netting or lacing on the outer skin of cantaloupe or similar surfacing on the outer part of various types of fruit. If the brush is so stiff that it removes such netting or lacing or any portion of the outer skin of cantaloupe or other fruit, the appearance is less attractive, and possible spoiling may also result.

It is significant that the fruit or other objects are not contacted by the bristles or other parts of the brush or any other materials or surfaces until the fruit reaches a point where it fits approximately between the belts 20 and the surface of the brush which is to remove it. Such contact occurs for only a short distance so that there is substantially no abrasion, and almost all of the contact between the brush and the fruit or other object C occurs to impart lateral movement to the fruit or other objects to discharge same from the moving conveyor M to the conveyor K-1 through K-4 therebelow. Such minimal contact between the brush and the fruit or other object C is made possible because of the full support provided by the two spaced belts 20 and because the brush which discharges the fruit or other objects does not contact it until it is at the location for the discharge. The brushes B-1 through B-4 may be positioned at angles of inclination as illustrated in FIG. 2, or each set of the brushes may be disposed substantially horizontally, but each set being at different distances from the moving conveyors M therebelow. When the brushes are set at an angle with the forward ends higher than the rearward ends as shown in FIG. 2, an even greater distribution of the separation occurs so that the cantaloupes or other objects C which are being discharged laterally by the brushes are spaced longitudinally as they are discharged and therefore, there is less likelihood that such objects C will fall upon one of the objects already on a lateral conveyor K-1 through K-4 below the brushes. Bruising by contacting other objects is thus minimized with the apparatus of this invention.

In the operation of the apparatus A of this invention, the unorganized quantity of cantaloupe or other objects C to be sized are fed to the inlet unit 60 by a conveyor, gravity or any other suitable means so that such objects C are forced to move into single substantially parallel rows in the substantially parallel channels 60a of the inlet unit 60. When the cantaloupe or other objects C reach the channels 60a, they are then received on the upper reaches of the pairs of flexible belts 20 forming the moving conveyors M and they are thereafter moved forwardly in rows by each of the moving conveyors M. The very largest of the objects C which cannot pass underneath the rotating brushes B are discharged laterally down the inclined chute 50 onto the conveyor K for lateral movement to a point of packaging or other disposition.

The objects C which pass the initial rotating heads B continue to move rearwardly on the moving conveyors until they engage one of the brushes B-1 through B-4, and upon making such engagement, the rotational movement of the brush imparts a lateral movement to the object C which is sufficient to roll it off of the moving conveyor M and cause it to drop to whichever of the conveyors K-1 through K-4 is therebelow at the point of discharge. It should be noted that the angle of inclination of the upper reaches of the belts 20 is approximately 30°, and preferably, the angle should not be any greater than 30°, so that a minimum amount of frictional contact is required between the bristles of the brushes and the cantaloupe or other object C to be discharged laterally from the belts 20. Even though the apparatus is specifically suitable for generally round objects such as cantaloupes, the apparatus will also properly size generally elliptical objects. Many cantaloupes are of that shape and are suitably sized with the apparatus A of this invention.

By discharging the groups of the objects C in different directions with the alternate sets of the brushes, the sized objects C may be more readily disposed on opposite sides of a central packaging area which facilitates the handling and the packaging of the cantaloupe or other objects C.

Since the cantaloupes C are thus sized so that they are discharged in groups of approximately the same size, the packaging of such sizes may be readily accomplished by relatively inexperienced personnel so as to place the particular sizes of cantaloupe in a cardboard box with a tight fit, but without bulging the box so that the cantaloupes are not damaged or bruised in transit.

Although the apparatus A has been illustrated with only four basic size separation groups, it will be understood that the number of size separation groups may be decreased or increased if this is desirable with a particular type of object or operation. Also, the number of moving conveyors and brushes thereabove may be varied, depending upon the quantity of the objects to be handled in a given period of time. Although the moving conveyors M preferably are substantially parallel to each other, they could be arranged at diverging angles with respect to each other should this be desirable for the distribution of the products. However, the substantially parallel rows of moving conveyors M is preferred with the present apparatus since it permits the location of the substantially perpendicular lateral conveyors K-1 through K-4 below the moving conveyors M to thereby facilitate the rapid movement of the objects which are separated according to size.

The foregoing disclosure and description of the invention are illustrative and explanatory thereof, and various changes in the size, shape, and materials as well as in the details of the illustrated construction may be made without departing from the spirit of the invention.

We claim:

1. Apparatus for sizing cantaloupes and other generally round objects, comprising:

a moving conveyor means extending longitudinally for supporting and conveying the objects longitudinally substantially along its longitudinal central axis;

a plurality of longitudinally disposed rotatable brushes, each having its longitudinal axis substantially vertically above the longitudinal central axis of said moving conveyor;

means for rotating each of said brushes about its longitudinal axis for laterally discharging objects engaged thereby from said moving conveyor; and said brushes being inclined downwardly in the direction of the feed of the objects by said conveyor and being spaced at successively lesser distances above said moving conveyor from the forward end to the rearward end of the apparatus whereby each of said brushes engages the objects for only a brief period of time and only during the lateral discharge of same from said moving conveyor.

2. The structure set forth in claim 1, wherein said moving conveyor includes:

a pair of longitudinally movable belts;

said belts being inclined towards each other, and means for moving said belts at substantially the same speed so that both of said belts move said objects without rubbing said objects thereon.

3. The structure set forth in claim 1, including:

a plurality of said moving conveyors disposed side by side and each of which is adapted to receive a row of said objects thereon for sizing;

a plurality of said brushes longitudinally aligned with and above each of said moving conveyors; and inlet feed means for directing an unorganized quantity of said objects onto said plurality of moving conveyors to form side by side rows thereof for separation by the engagement with said brushes.

4. The structure set forth in claim 3, wherein each of said moving conveyors includes:

a pair of longitudinally movable belts;

said belts being inclined towards each other; and means for moving said belts at substantially the same speed so that both of said belts move said objects without rubbing said objects thereon.

5. The structure set forth in claim 1, wherein:

each of said brushes is inclined downwardly from its forward end to its rearward end; and the rearward end of each successive brush being at substantially the same height as the forward end of the next brush so as to provide a gradually decreasing space between said brushes and said conveyor to thereby laterally discharge the objects from the conveyor at longitudinally spaced points to prevent bruising or other damage to said objects by being discharged at the same point at about the same time.

6. The structure set forth in claim 1, including:

means for rotating alternate brushes in opposite directions;

a laterally moving conveyor disposed below each of said brushes; and means for moving each laterally moving conveyor in the direction in which said objects are received thereon from the brush disposed thereabove.

7. The structure set forth in claim 1, wherein said moving conveyor includes:

a pair of longitudinal endless belts laterally spaced from each other and adapted to receive said objects thereon; and a longitudinal support having belt-engaging surfaces which are inclined with respect to vertical and towards each other for receiving and guiding the upper reaches of said endless belts at opposite angles of inclination corresponding to said surfaces.

* * * * *